United States Patent [19]

Yajima

[11] 3,920,314

[45] Nov. 18, 1975

[54] MODE CONVERSION AND MODE SEPARATION BRANCHED DIELECTRIC WAVEGUIDE ELEMENT FOR LIGHT

[75] Inventor: Hiroyoshi Yajima, Tokyo, Japan

[73] Assignee: Agency of Industrial Science and Technology, Tokyo, Japan

[22] Filed: Mar. 12, 1974

[21] Appl. No.: 450,333

[30] Foreign Application Priority Data

June 5, 1973 Japan.............................. 48-62559

[52] U.S. Cl. ....... 350/96 WG; 350/96 C; 350/160 R
[51] Int. Cl.² .............................................. G02B 5/14
[58] Field of Search ..................... 350/96 WG, 96 C

[56] References Cited
UNITED STATES PATENTS

| 3,465,159 | 9/1969 | Stern | 350/96 WG X |
| 3,589,794 | 6/1971 | Marcatili | 350/96 WG |
| 3,614,198 | 10/1971 | Martin et al. | 350/96 WG |
| 3,795,433 | 3/1974 | Channin | 350/96 WG |
| 3,804,489 | 4/1974 | Li et al. | 350/96 WG X |

Primary Examiner—John K. Corbin
Attorney, Agent, or Firm—Oblon, Fisher, Spivak, McClelland & Maier

[57] ABSTRACT

A mode conversion and mode separation branched dielectric waveguide element for light comprising branches having optically different characteristics which are surrounded by a medium or media having different refractive indexes from that of the dielectric material or materials forming the branches. In one embodiment, one of the surrounding media is an electro-optical crystal provided with at least one pair of electrodes near the parting portion of the branches. As a modification, the branches may be connected at the opposite ends thereof to form a by-pass construction.

6 Claims, 25 Drawing Figures

MODE CONVERSION AND MODE SEPARATION BRANCHED DIELECTRIC WAVEGUIDE ELEMENT FOR LIGHT

BACKGROUND OF THE INVENTION

The present invention relates to a mode conversion and mode separation dielectric waveguide element for light which is suitable for modulating a light wave, to switch the optical transmission line of the light wave and/or to transform the propagation mode thereof.

Hopes have been held that light waves might be used in place of electro-magnetic waves in the field of information processing art, because a considerable improvement in the information processing performance can be expected due to the facts that: (1) the frequency of light is as much as $10^5$ times higher than that of microwaves so that the information transmitting capacity of light is much larger than that of the microwaves and (2) the wavelength of light is as much as $10^{-5}$ times shorter than that of the microwaves so that circuit elements used for light can be super-minituarized.

However, an attempt to fabricate such circuit elements for light as directional couples, mode-transforming elements, modulation elements, filters and/or isolaters etc., using similar methods to those used in fabricating the circuit elements for the microwave range, leads to many problems in connection with the properties of the materials and the fabrication techniques used to produce such elements.

The conventional metal waveguide is generally used to guide electro-magnetic waves. However, it is known that such metal waveguide has a large absorption coefficient for the light wave range and this means that any light wave transmitted through the metal waveguide would be largely attenuated. For this reason, use of a waveguide formed of optically transparent dielectric material having a refractive index higher than that of the circumferential material has been proposed for light transmission. There have been proposed light modulation elements in the form of optical integrated circuits which on the basis of the abovementioned consideration, are formed by combining the dielectric waveguide with an electrooptical crystal. However, the modulability obtainable by using an element of this kind which utilizes a single waveguide is on the order of 50% at most and, in order to detect the modulation effect, it has been necessary to once guide the light wave out of the waveguide by using a prism coupler etc. On the other hand, as a method for transforming the propagation mode of light in such waveguide, it has been proposed to dispose a dielectric waveguide on an anisotropic optical crystal and to cause two specific modes having different polarization directions to become phase-matched by controlling the thickness of the waveguide. This method, however, entails a technical difficulty in that the thickness of the waveguide must be precisely controlled. Even if such technical difficulty is overcome, it is still impossible, in general, to perform conversions between any desired two modes other than the specific modes.

The present invention was made in view of these problems and, therefore, one object of the present invention is to provide a mode conversion and mode separation dielectric branched waveguide element for light which is applicable to modulation and/or switching of light waves.

Another object of the present invention is to provide a mode conversion and mode separation dielectric branched waveguide for light which is applicable to mode conversion and/or mode switching between any desired two modes among a group of orthogonal modes having a common plane of polarization.

SUMMARY OF THE INVENTION

These objects of the present invention are achieved by fabricating the dielectric waveguide of dielectric materials having a refractive index larger than that of circumferential medium in such a manner that it comprises a main transmission path and at least one branch path the optical characteristics of which are different from those of the main path and in such a manner that the optical characteristics of at least a portion of either of the paths are made different and/or changeable, or be fabricating the waveguide in such a manner that it comprises a main path and at least one by-path the optical characteristics of which are different from those of the main path and in such a manner that the optical characteristics of at least a portion of either the main path or the by-path are made different and/or changeable.

In the present invention, different media are used to surround the respective paths so that the optical characteristics of the paths are made different. In some cases, an electrooptical crystal in plane contact with at least a portion of the input region and at least a portion of the output region of the main path and/or the branch or by-path, and a pair of electrodes provided on and along the surface of the electrooptical crystal which is in contact with the regions are provided as one of the media for the same purpose.

Other objects and other characteristics of the present invention will become apparent from the description which is made in further detail herein below with reference to the accompanying drawings.

DETAILED EXPLANATION OF THE INVENTION

Figure 1:
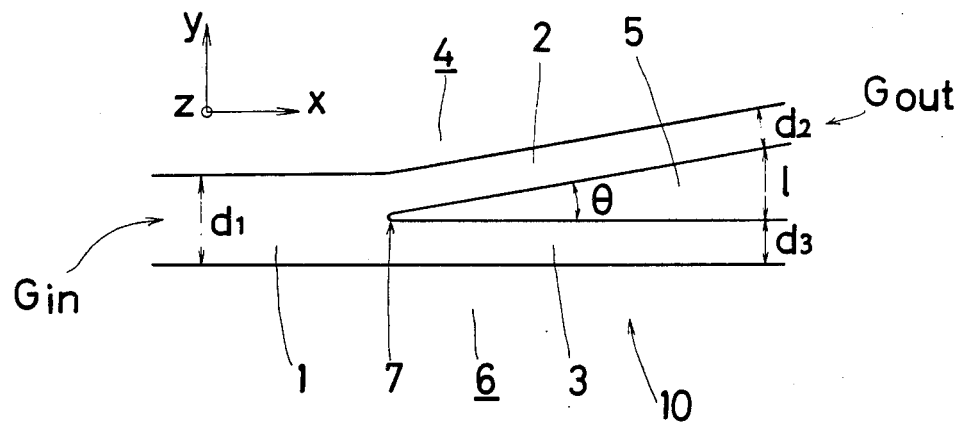
FIG. 1 is a conceptional illustration using a two dimensional model to explain the principle of the present invention.

Returning to FIG. 1 which is a conceptional illustration using a two dimensional model to explain the principle of the present invention, a waveguide 10 is formed of dielectric materials having different refractive indexes. The waveguide 10 is formed with a branch constituting an input portion $G_{in}$ (line 1) thereof and two branches 2 and 3 constituting an output portion $G_{out}$ thereof. The branches 1 and 3 form a main transmission line or path. Spaces existing above the line constituted of the branches 1 and 2, between the branches 2 and 3 and below the main path constituted of the branches 1 and 3 are filled with different media 4, 5 and 6, respectively. At this time it is assumed that widths $d_1$, $d_2$ and $d_3$ of the respective branches are uniform respectively throughout the lengths thereof and that the following relation exists among them:

$$d_1 = d_2 + d_3.$$

Further, where the refractive index of the branches 1, 2 and 3 of the waveguide element and the media 4, 5 and 6 filling the above defined spaces are represented as $n_1$, $n_2$, $n_3$, $n_4$, $n_5$ and $n_6$, respectively, the following relation is necessary to propagate light through the branched waveguide element 10 formed of the dielectric material;

$$n_1, n_2, n_3 > n_4, n_5, n_6$$

It will be necessary, at this time, to consider how the respective modes of the light wave propagate through the branches.

In general, there is a finite number of propagation modes in the waveguide element and these modes can be classified into several orthogonal mode trains depending upon the polarization directions of the main components of electro-magnetic fields thereof. For example, in a two dimensional waveguide such as shown in FIG. 1, the propagation modes can be classified into two orthogonal mode trains, one being TE mode which has an electrical field component only in the Z direction and the other being TM mode which has a magnetic field component only in the Z direction. For convenience, a detailed explanation is given only of the TE mode. TE mode includes TE1, TE2, TE3 and TE4 modes depending upon the number of peaks in the distribution of the electric field component in the Z direction with respect to the Y direction.

FIGS. 2(A) to 2(D) show the propagating conditions for different light wave modes in the respective branches of the waveguide element 10, where $d_2=d_3=1.0\mu m$, $n_2=n_3=1.56$, $n_4=1$, $n_5=n_6=1.458$.

Figure 2A:
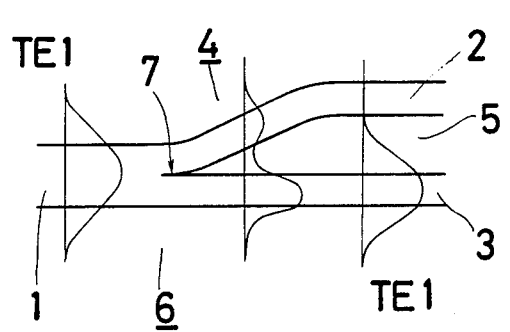
FIGS. 2(A) to 2(D) illustrate propagations of different modes through the element shown in FIG. 1.
Figure 2B:
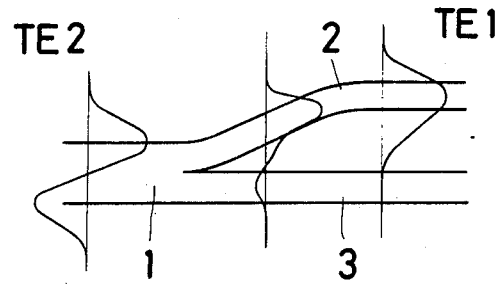
Figure 2C:
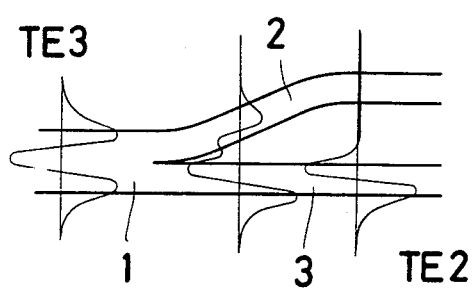
Figure 2D:
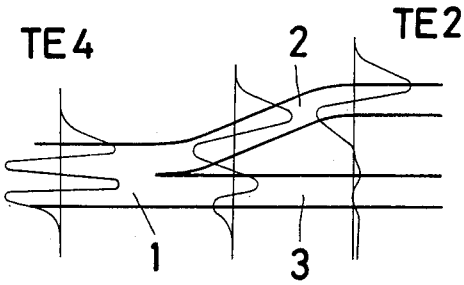

As will be clear from FIG. 2(A), the main electric component of TE1 mode in the branch 1 propagates through the branch 1 and at a point sufficiently remote from a parting portion 7 of the branches 2 and 3, the electric field distribution in the branch 3 becomes similar to TE1 mode in the branch 1. On the other hand, TE2 in the branch 1 propagates to the branch 2, resulting in TE1 mode at the output portion as seen in FIG. 2(B). Further, as will be seen in FIGS. 2(C) and 2(D), when TE3 and TE4 modes are in the branch 1, these modes are transformed into TE2 in the branches 2 and 3, respectively.

From the foregoing, it will be clear that the energy of each of the modes propagating through the branch 1 of the dielectric branched waveguide element is transferred only to one of the branches 2 or 3 and is never transferred to the other branch.

At this time, it will be convenient to consider the rule governing the occurrence of such propagation characteristics when introduction of a propagation constant K (defined by $2\pi/\lambda$ where $\lambda$ is the wavelength of the propagation wave) is used to characterize the respective propagation modes.

Figure 3:
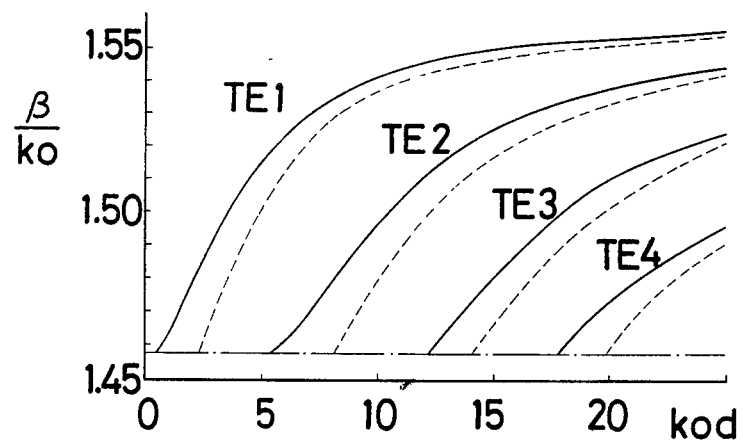
FIG. 3 is a graph showing the variation in the propagation constant of a single dielectric waveguide line with respect to the thickness thereof.

FIG. 3 shows the variations in the propagation constants in a single dielectric waveguide element with respect to the width $d$ thereof. The coordinates are calibrated with normalized units. That is, the ordinate is calibrated with $\beta/Ko$ and the abscissa with $Kod$, where $Ko$ is the propagation constant of a plane wave in vacuum, $\beta$ is the propagation constant of TE mode propagating in the waveguide element and $d$ is the thickness or width of the waveguide of the element. The solid curves in FIG. 3 show the propagation constants of the TE modes of a 3 layered waveguide when the refractive index of the dielectric material constituting the transmission line is 1.56 and that of the surrounding media is 1.457. These curves provide the propagation constants of TE modes propagating through a portion of the branch 3 having a desired thickness which is sufficiently remote from the parting portion 7. The dotted curves in FIG. 3 show propagation constants of the TE modes in a 3 layered waveguide when the refractive index of the mode transmitting media is 1.56 and those of the surrounding media are 1.0 and 1.456 respectively. These curves provide the propagation constants of TE modes propagating through a portion of the branch 2 having a desired thickness, which portion is sufficiently remote from the parting portion 7.

From the foregoing, it will be clear that the branch which is in contact with the medium having a smaller refractive index than that of the other medium provides a smaller propagation constant than that of the other branch for a common propagation mode, even when the thickness of these branches are the same. It is also clear that the propagation constant is larger at thicker parts of the branch.

On the basis of the foregoing, mode conversions are explained with reference to FIGS. 4 and 5.

Figure 4:
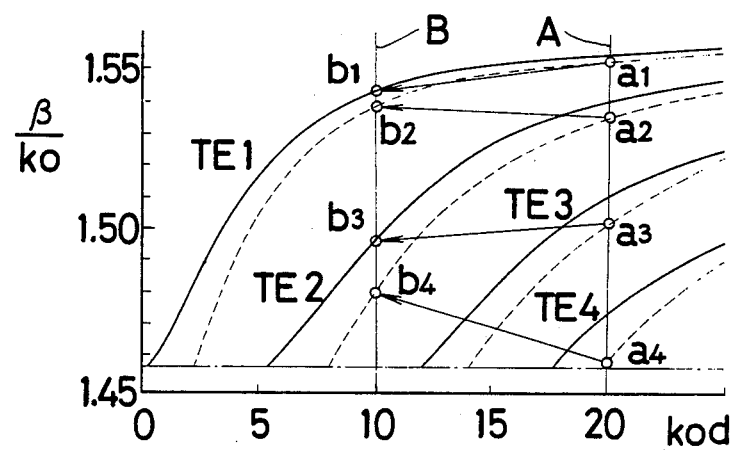
FIG. 4 illustrates mode conversion processes when an embodiment of the present invention is used.

FIG. 4 shows the mode conversion processes when the following conditions are given to the dielectric waveguide element; $n_1=n_2=n_3=1.56$, $d_1=2.0\mu m$, $d_2=d_3=1.0\mu m$, $n_4=1.0$ and $n_5=n_6=1.457$. When it is assumed that the wavelength of the light is $0.63\mu m$, the propagation constants of the respective modes propagating through the branch 1 are given as points $a_1$, $a_2$, $a_3$ and $a_4$ which are the points of intersection of the dotted curves and a line "A" drawn at $d_1=2.0\mu m$. In a similar manner, the propagation constants of the respective modes propagating through the branch 2 are given by the points $b_2$ and $b_4$ which are the points of intersection of the dotted curves and a straight line "B" drawn at $d_2=1.0\mu m$, and those propagating through the branch 3 are given by the points $b_1$ and $b_3$ which are the points of intersection of the solid curves and the line "B".

The TE mode in the branch 1 which is given by the intersection point $a_1$ is converted to TE1 mode in the branch 3 which is given by the intersection point $b_1$ and TE2 modes in the branch 1 which is given by the intersection point $a_2$ is converted to TE1 mode in the branch 2 which is given by the cross point $b_2$. In the same manner, TE3 mode in the branch 1 is converted to TE2 mode in the branch 3 and TE4 mode in the branch 1 is converted to TE2 mode in the branch 2.

Figure 5:
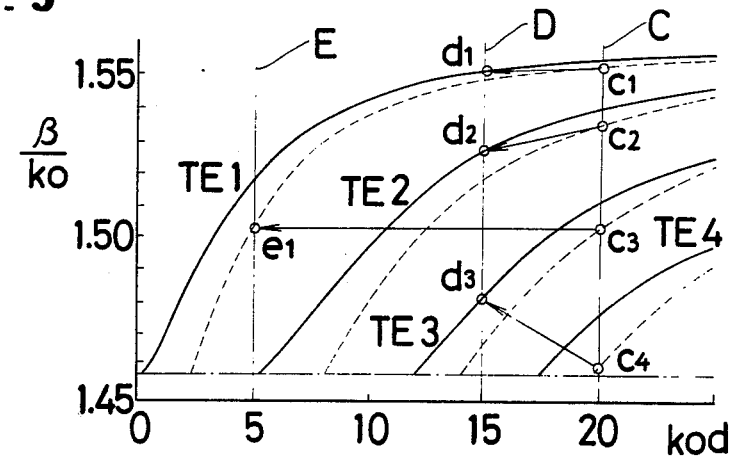
FIG. 5 illustrates mode conversion processes when another embodiment of the present invention is used.

FIG. 5 shows the mode conversion effects obtained by a waveguide having conditions $n_1=n_2=n_3=1.56$, $d_1=2.0\mu m$, $d_2=0.5\mu m$, $n_4=1.0$, $d_3=1.5\mu m$, and $n_5=n_6=1.457$. Similarly to FIG. 4, intersection points of a line "C" and the dotted curves are represented as $c_1$, $c_2$, $c_3$ and $c_4$ and intersection points of a straight line "D" and the solid curves are represented as $d_1$, $d_2$ and $d_3$. The intersection point of the straight line "E" and the dotted curve is represented as $e_1$. Thus, TE1 mode in the branch 1 is converted to TE1 in the branch 3, TE2 mode in the branch 1 to TE2 mode in the branch 3, TE3 mode in the branch 1 to TE1 mode in the branch 2 and TE4 mode in the branch 1 to TE3 mode in the branch 3, respectively.

The abovementioned mode conversion process is summarized as follows. In case of TE mode propagation, the TE1 mode in branch 1 is converted to the TE mode of a largest propagation constant between branch 2 and 3. The TE2 mode in branch 1 is then converted to the TE mode of secondary largest propagation constant between two branches and so on. The same results are also obtained in the two branches and so on. The same results are also obtained in the TM mode propagation.

As will be clear from the foregoing, when a specific mode is guided into a branched waveguide formed of a dielectric material having a refractive index larger than that of the medium surrounding the waveguide and constructed optically asymmetrically such that there are differences in thickness and/or refractive index in the surrounding media between the branches thereof, the mode is transmitted to only one of the two branches (2 or 3) depending upon the asymmetry. If the abovementioned asymmetry in the transmission lines can be reversed, any specific mode in the branch 1 will be transmitted to the other branch, thus enabling a modulation or switching of the light wave.

An embodiment of the present invention for performing the above functions will be described with reference to FIG. 6.

Figure 7A:
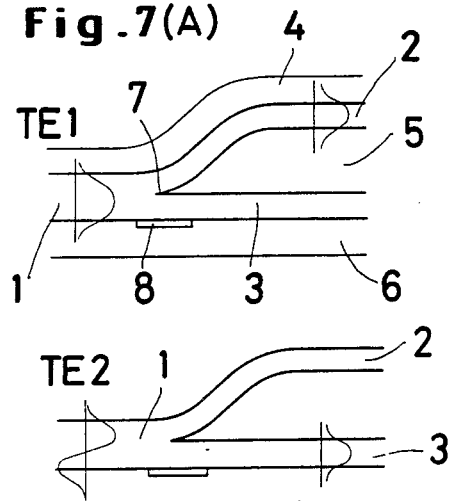
FIGS. 7(A) to 7(D) illustrate propagation modes through the waveguide shown in FIG. 6.

A portion of the dielectric material region which forms the branches 1 and 3 of the branched waveguide 10 (FIG. 1) is provided in contact with a substrate 6 of an electrooptical crystal whose refractive index varies with the application of electric field. The dielectric region is branched toward one end thereof to form the branch 2 and a space between the branches 2 and 3 is filled with the medium 5. The side of the dielectric region which is opposite to the side in contact with the substrate 6 is covered by the medium 4. Further, a pair of electrodes 8 are provided on the upper surface of the substrate 6 and at a position thereof near the parting portion 7 of the dielectric region. The optical characteristics of these regions are assumed to be the same as in the case shown in FIG. 1, that is, $n_1=n_2=n_3$, $d_2=d_3$ and $n_4>n_6$. In this case, however, the difference between $n_4$ and $n_6$ is assumed as very small. Under these conditions, the propagation constant of the branch 2 at a position thereof sufficiently remote from the parting portion 7 is slightly larger than that of the branch 3 with respect to one mode and so TE1 mode in the branch 1 propagates through the parting portion 7 to the branch 2 as shown in FIG. 7(A). (The same effect will be obtained under the conditions of $n_4=1.0$, $n_4<<n_6$ and $d_2>>d_3$ etc. However, the previous optical characteristics are employed in the following description.)

Figure 7B:
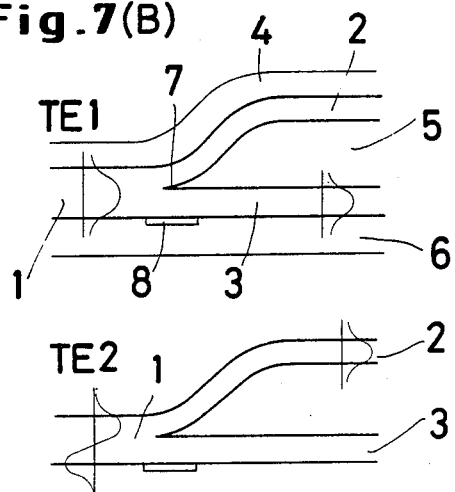

Under these optical conditions, when an electric voltage is applied across the electrodes provided on the substrate 6 at a position near the parting portion 7, the refractive index of the corresponding portion of the substrate 6 is increased. (In general, the refractive index is increased or decreased depending upon the material thereof. However, in this case, it is also assumed for convenience, that the refractive index is increased by the voltage application.) When the refractive index of the substrate 6 is increased to a certain extent, it is possible to effectively increase the propagation constant for the mode propagating through the branch 3 beyond that for the mode in the branch 2, with the result that TE1 mode in the branch 1 will be propagated to the branch 3 as shown in FIG. 7(B).

Figure 7C:
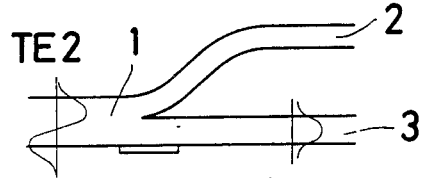
Figure 7D:
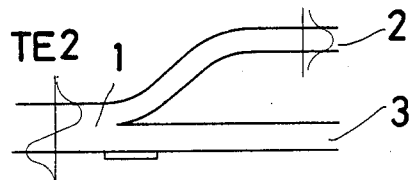

In a similar manner, without the voltage application, TE2 mode initially propagating in the branch 1 will be propagated to the branch 3 and transformed to TE1 mode as shown in FIG. 7(C). Under this condition, when the electric voltage is applied across the electrodes, it will be transferred to the branch 2 as TE1 as shown in FIG. 7(D).

The foregoing explanation for the TE mode can also be applied to the TM mode.

Figure 8:
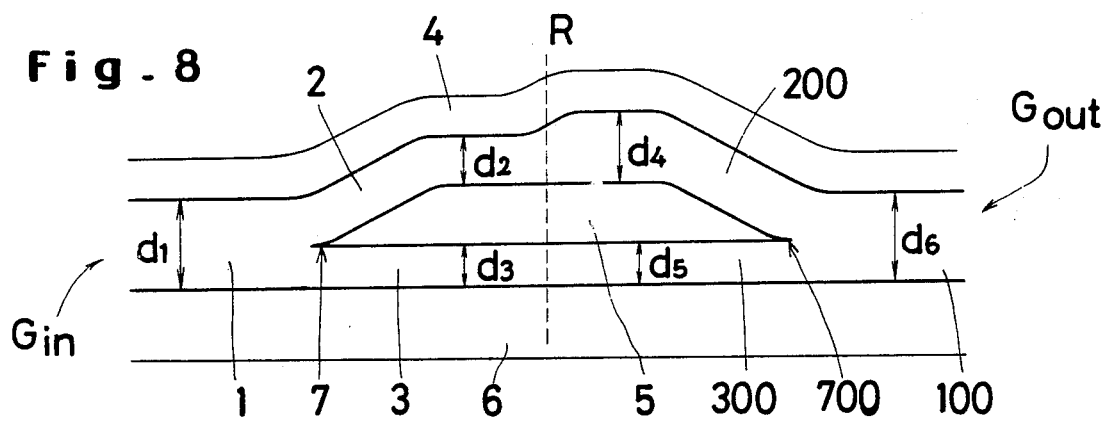
FIG. 8 is another embodiment of the present invention.

The previously mentioned conversions of mode in a waveguide having a branched construction can also occur in another embodiment of the invention which has a construction such as shown in FIG. 8.

In FIG. 8, the part of the device to the left of dotted line R is substantially the same in construction as that shown in FIG. 2 or 7. The branches 2 and 3 are connected to branches 200 and 300 respectively, the latter two branches being connected together at a junction 700 to form a waveguide 100 which forms an output portion $G_{out}$. The thicknesses of the branches 200, 300 and 100 are $d_4$, $d_5$ and $d_6$, respectively. The relationships between these thicknesses are $d_3=d_5$, $d_4>d_2$ and $d_6 \simeq d_4 + d_5$. However, these relationships are not critical and various modifications are possible.

The conversion of the modes propagating through this waveguide will be described.

In this case, it is assumed that the propagation constant of a portion of the branch 3 sufficiently remote from the parting portion 7 is larger than that of the corresponding portion of the branch 2 for the same propagation mode and the propagation constant of the branch 200 is larger than that of the branch 300 for the same propagation mode.

For example, the refractive indexes of the waveguide branches 100, 200 and 300 are represented as $n_{100}$, $n_{200}$ and $n_{300}$, respectively and the conditions, $n_1=n_2=n_3=n_{100}=n_{200}=n_{300}=1.56$, $n_4=1.0$, $n_5=n_6=1.474$, $d_1=2.0\mu m$, $d_2=d_3=d_5=1.0\mu m$, $d_4=1.4\mu m$ and $d_6=2.4\mu m$, are assumed. The mode conversion in the left side of the waveguide under the above conditions was already explained with reference to FIG. 4, that is, TE1 mode propagating through the branch 1 is converted to TE1 mode in the branch 3, TE2 mode in the branch 1 to TE1 mode in the branch 2, TE3 mode in the branch 1 to TE2 mode in the branch 3 and TE4 mode in the branch 1 to TE2 in the branch 2, respectively.

Figure 9:
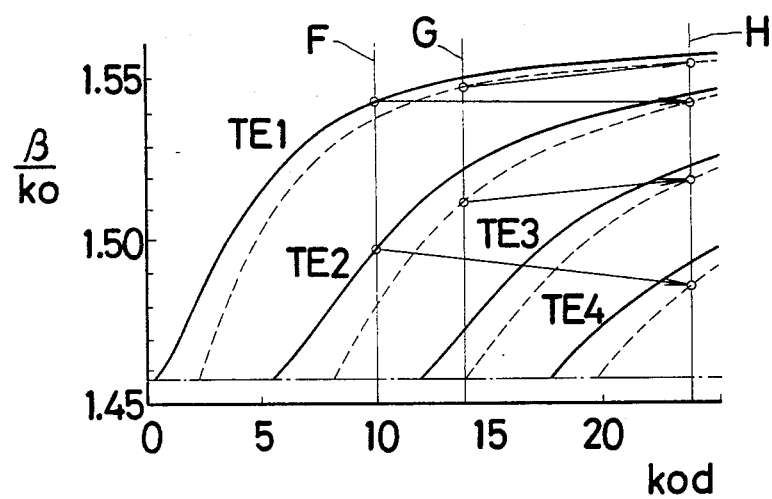
FIG. 9 is a graph showing the variation in the propagation constant used to explain the propagation of the transformed modes.

An explanation will now be given with respect to FIG. 9 on how the modes thus converted propagate to the right side of the waveguide.

The propagation constant of the mode propagating through the branch 200 is given by the intersection point of the straight line "G" and the dotted curves and that of the mode propagating through the branch 300 is given by the intersection point of the straight line "F" and the solid curves. Further, since it is assumed that the thickness of the branch 100 is 2.4μm, the propagation constant for the TE mode propagating through the branch 100 is given by the intersection point of the straight line "H" and the dotted curves. TE modes propagating through the branches 200 and 300 are converted to modes in the branch 100 respectively as shown by arrows in FIG. 9, according to the aforementioned mode conversion rules.

In summary, TE1 mode in the branch 1 propagates through the parting portion 7 to the branch 3 as it is and through the junction 700 to the branch 100 as TE2 mode. TE2 mode in the branch 1 is converted to TE1 mode in the branch 2 and then to TE1 in the branch 100. In a similar manner, TE3 and TE4 modes in the branch 1 are converted to TE4 and TE3 modes in the branch 100, respectively.

Figure 10:
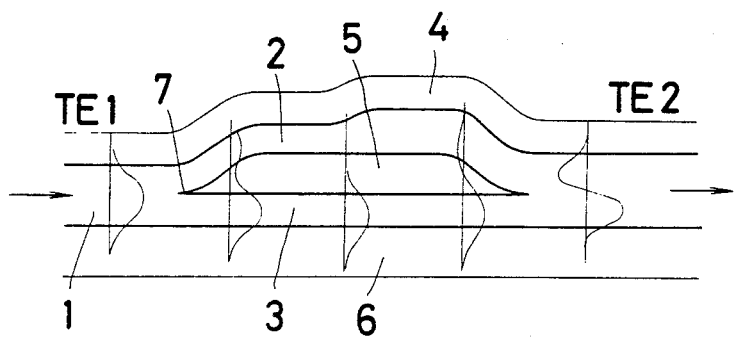
FIGS. 10(A) and 10(B) illustrate the propagations of different modes through the waveguide shown in FIG. 8.
Figure 10:
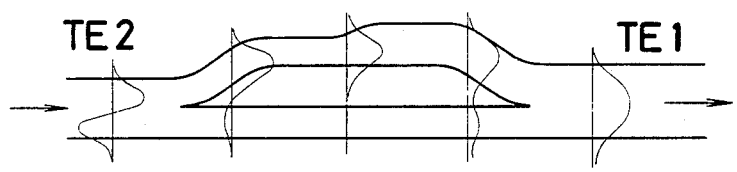

FIG. 10 shows the above-mentioned conversions along the branches when TE1 mode (FIG. 7(A)) and TE2 mode (FIG. 7(B)) are assumed as introduced into the branch 1, respectively. These modes appear in the branch 100 as TE2 and TE1 respectively. As mentioned previously, in a transmission line including asymmetrical branches which are as shown in FIG. 8 and the optical characteristics of which are different from each other, the modes propagating through the branches are converted. Although the conversion between TE1 and TE2 modes are described with respect to FIG. 10 by way of example, it is possible to provide mode conversion between any two orthogonal modes having the same polarization direction by varying the optical structure of the branches.

Figure 6:
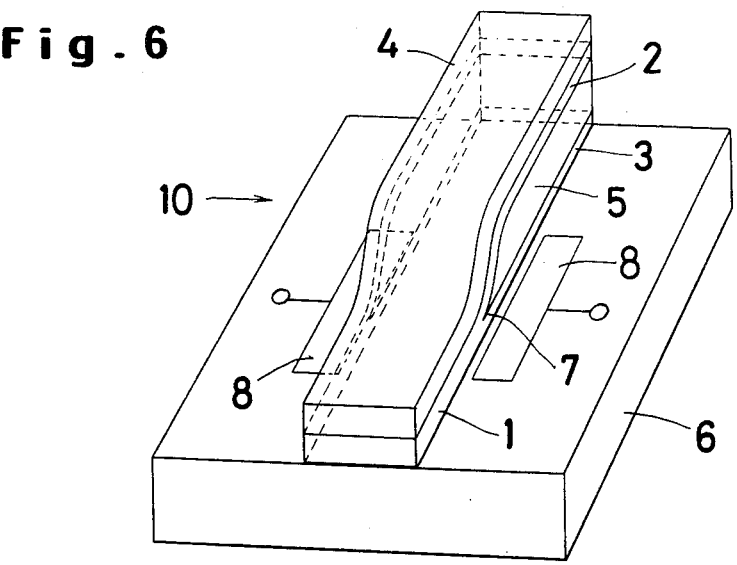
FIG. 6 is a perspective view of a further embodiment of the present invention.

It will be clear from the following description that an element which controls the mode conversion electrically can easily be constructed in a manner similar to that of the element shown in FIG. 6.

FIGS. 11(A) to 11(D) show conversion of modes propagating through an element composed of a dielectric waveguide and an electrooptical crystal as in the case of FIG. 6, the waveguide including branches having asymmetrical physical constructions. In this case, however, it is assumed that the propagation constant of the branch 2 (and 200) is larger than that of the branch 3 (and 300) for the same propagation mode, that the medium 6 is an electrooptical crystal and the electrooptical effect occurs around the parting portion 7 and that the refractive index of the portion is increased upon application of voltage as in the element shown in FIG. 6.

Under these conditions, when the applied voltage is zero, TE1 mode in the branch 1 propagates to the branch 2 and then through the branch 200 which has the same thickness as that of the branch 2 and through the junction 700 to the branch 100 as it is, as shown in FIG. 11(A). Then, when a constant voltage is applied across the electrodes on the electrooptical crystal, the propagation constant of the branch 3 becomes larger than that of the branch 2 and the TE1 mode in the branch 1 is transferred to the branch 3 as it is, as shown in FIG. 11(B). Since this mode propagates through the branch 300 and through the junction 700 to the branch 100 and the propagation constant of the branch 300 is smaller than that of the branch 100, the mode is converted to TE2 and enters into the branch 100.

This consideration is also applicable to TE2 mode in the branch 1. That is, without voltage, TE2 mode is not changed as shown in FIG. 11(C). However, with voltage, it is converted to TE1 mode as shown in FIG. 11(D).

Figure 11:
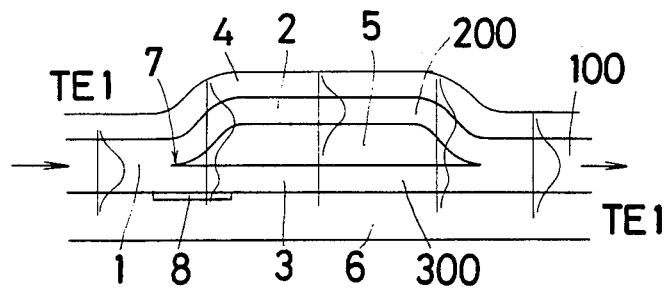
FIGS. 11(A) to 11(D) illustrate the propagations of modes through still another embodiment of the present invention.
Figure 11:
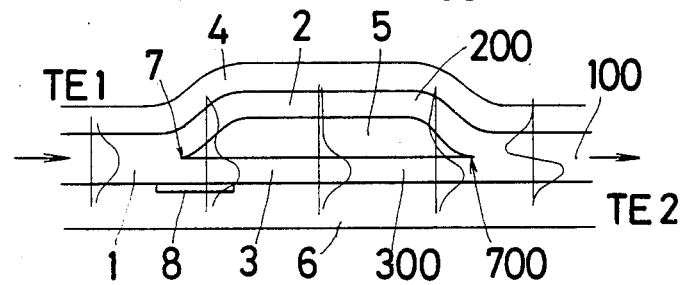
Figure 11:
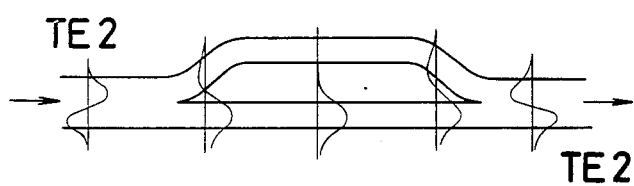
Figure 11:
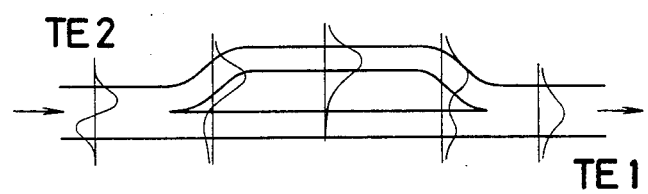
Figure 12:
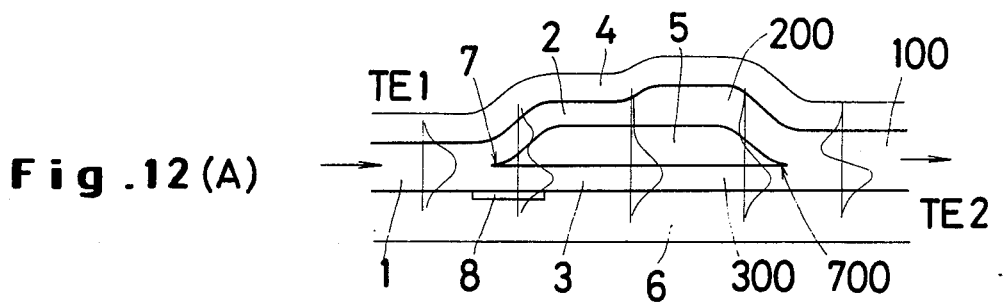
FIGS. 12(A) to 12(D) illustrate mode conversion processes obtainable with the embodiment shown in FIG. 8.
Figure 12:
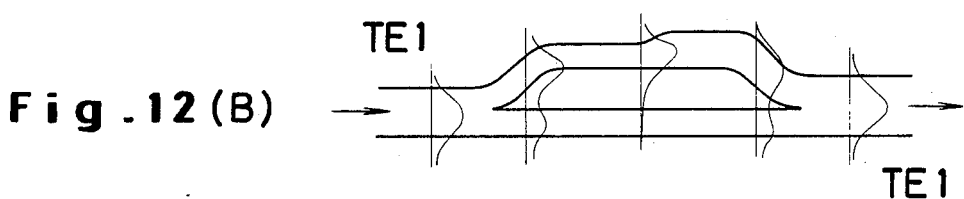
Figure 12:
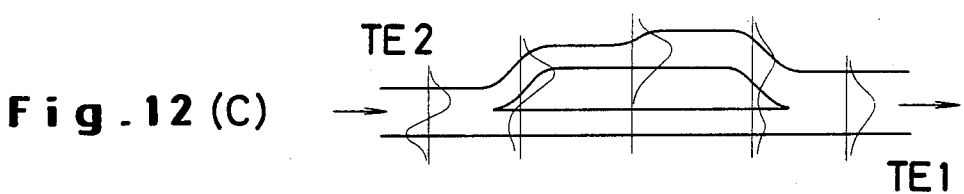
Figure 12:
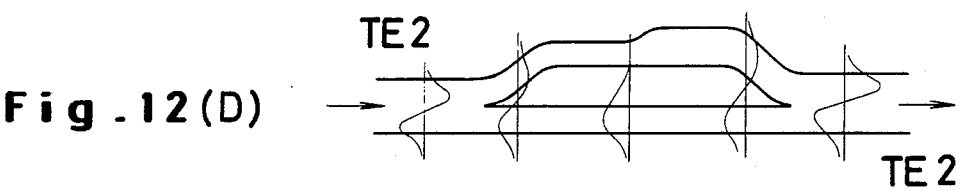

FIG. 12 shows substantially the same propagation conditions as those in FIG. 11, except that the physical dimensions of the branches 2 and 200 are selected to be asymmetrical.

In this Figure, the propagation constants of the branches 2 and 200 are larger than those of the branches 3 and 300, respectively, for the same propagation mode and the remaining optical and/or structural conditions are the same as those shown in FIG. 11.

Under these conditions, when the voltage is not applied across the electrodes 8, TE1 mode in the branch 1 propagates through the branch 3 and then through the junction 700 and appears in the branch 100 as TE2 mode as shown in FIG. 12(A). Then, when a voltage is applied across the electrodes on the electrooptical crystal, TE1 mode in the branch 1 propagates to the branch 2 and the branch 200 having a larger propagation constant than that of the branch 2 and appears in the branch 100 as TE1 as shown in FIG. 12(B).

For TE2 mode propagating through the branch 1, the same reasoning is applicable. That is, without voltage application, it appears in the branch 100 as TE1 as shown in FIG. 12(C), while with the voltage there is no conversion thereof as shown in FIG. 12(D). In this manner, the mode conversion obtainable by the dielectric waveguide having optically asymmetrical construction is reversed upon the application of voltage to the electrodes on the electrooptical crystal 6.

As previously described, by employing in combination an electrooptical crystal which is provided with a pair of electrodes as one of the surrounding media and a pair of dielectric transmission lines, an electrical mode conversion element for orthogonal modes having the same polarization direction can be realized. While, in the previous description, the explanation refers mainly to conversion between TE1 and TE2 modes, conversions between any two orthogonal modes having the same polarization direction such as between TE1 and TE3 etc. can be performed by varying the optical construction of the branch or branches.

The foregoing description of TE modes is, of course, applicable similarly to TM modes.

As mentioned above, according to the present invention, the transmission line for modes propagating through a branch can be electrically switched at will by asymmetrically combining an electrooptical crystal and dielectric branched waveguide lines and, a modulation of substantially 100% can be achieved by applying a voltage near the parting portion so that the light wave propagates along only a specific branch. Further, according to the present invention, a combination of a mode conversion and a mode switching can be achieved electrically by employing a plurality of dielectric branches, and suitable surrounding media including an electrooptical crystal provided with a pair of electrodes.

The advantages of the present invention are summarized as follows;

1. The present mode conversion and mode separation dielectric branched waveguide element makes it possible to direct a mode propagating through the element to either of two branches.

2. Mode conversion between any two orthogonal modes having the same polarization direction is possible.

3. Switching, mode conversion and/or mode switching can be achieved by a combination of an electrooptical crystal and the branches.

4. The element of the present invention has a simple construction and the fabrication thereof is relatively easy in comparison with the conventional optical integrated circuit element since precision on the order of the wave-length of light is not required in the fabrication thereof.

What is claimed is:

1. A mode conversion and mode separation branched waveguide element for incoming light comprising a first light transmission line formed of a dielectric material having a refractive index larger than that of the surrounding material and a second light transmission line formed of a dielectric material having a refractive index larger than that of the surrounding material, said lines being separate and non-contacting over a portion thereof and being connected at an angle to each other at one end, said first transmission line being different in optical characteristics from said second transmission line to effect mode conversion and mode separation of incoming light.

2. A mode conversion and mode separation branched waveguide element as set forth in claim 1 wherein a portion of the surrounding material of one of said lines is an electrooptical crystal, said electrooptical crystal being in plane contact with said one of said lines.

3. A mode conversion and mode separation branched waveguide element as set forth in claim 2 further comprising a pair of electrodes disposed on said electrooptical crystal near the connecting portion of said lines.

4. A mode conversion and mode separation branched waveguide element as set forth in claim 3 wherein the other end of said second light transmission line is connected to the other end of said first transmission line to form a by-pass construction.

5. A mode conversion and mode separation branched waveguide element as set forth in claim 4 wherein the thickness of either of said light transmission lines is varied therealong.

6. A mode conversion and mode separation branched waveguide element as set forth in claim 1 wherein the other end of said second light transmission line is connected to the other end of said first transmission line to form a by-pass construction.

* * * * *